(12) United States Patent
Venturati (10) Patent No.: US 10,415,805 B2
(45) Date of Patent: Sep. 17, 2019

(54) LIGHTING FIXTURE AND RELATED CONTROL METHOD

(71) Applicant: CLAY PAKY S.p.A., Seriate (IT)

(72) Inventor: Carlo Venturati, Cividate Al Piano (IT)

(73) Assignee: Clay Paky S.P.A., Seriate (IT)

( * ) Notice: Subject to any disclaimer, the term of this patent is extended or adjusted under 35 U.S.C. 154(b) by 334 days.

(21) Appl. No.: 15/295,406

(22) Filed: Oct. 17, 2016

(65) Prior Publication Data

US 2017/0108199 A1   Apr. 20, 2017

(30) Foreign Application Priority Data

Oct. 19, 2015  (IT) .......................... 102015000063046

(51) Int. Cl.
| | | |
|---|---|---|
| F21V 21/14 | (2006.01) | |
| F16H 25/20 | (2006.01) | |
| F21V 21/15 | (2006.01) | |
| F21V 23/04 | (2006.01) | |
| H02K 7/06 | (2006.01) | |
| G01D 5/245 | (2006.01) | |
| F21W 131/406 | (2006.01) | |

(52) U.S. Cl.
CPC ......... *F21V 21/14* (2013.01); *F16H 25/2015* (2013.01); *F21V 21/15* (2013.01); *F21V 23/0492* (2013.01); *G01D 5/2451* (2013.01); *H02K 7/06* (2013.01); *F21W 2131/406* (2013.01)

(58) Field of Classification Search
CPC .......... F21S 10/06; F21V 14/04; F21V 17/02; F21V 7/0008; F21W 2131/406
See application file for complete search history.

(56) References Cited

U.S. PATENT DOCUMENTS

| 9,217,559 | B2 * | 12/2015 | Rasmussen | ............. F21V 21/15 |
| 2003/0137842 | A1 * | 7/2003 | Chang | .................... F21S 10/06 362/284 |
| 2012/0139395 | A1 | 6/2012 | Dietrich | |

FOREIGN PATENT DOCUMENTS

| GB | 2 097 197 | 10/1982 |
| WO | WO 2010/117216 | 10/2010 |
| WO | WO 2013/139338 | 9/2013 |

* cited by examiner

*Primary Examiner* — Elias Desta
(74) *Attorney, Agent, or Firm* — Leason Ellis LLP (57) ABSTRACT

A lighting fixture comprising:
  at least one movable element;
  at least one rotary actuator coupled to the movable element to move the movable element;
  a transmission assembly coupled to the rotary actuator and to the movable element to transfer the movement between the rotary actuator and the movable element;
  at least one position sensor coupled to a component selected in a group comprising the transmission assembly, the rotary actuator and the movable element; the position sensor being configured to detect the position of the component;
  a calculation unit coupled to the position sensor and configured to determine a displacement of the component based on the positions detected by the position sensor.

20 Claims, 4 Drawing Sheets

FIG. 4

LIGHTING FIXTURE AND RELATED CONTROL METHOD

CROSS-REFERENCE TO RELATED PATENT APPLICATIONS

The present application claims the benefit of priority under 35 U.S.C. § 119 of Italian patent application serial No. 102015000063046, filed Oct. 19, 2015, which is hereby incorporated by reference in its entirety.

TECHNICAL FIELD

The present invention relates to a lighting fixture, in particular a stage projector.

BACKGROUND OF THE INVENTION

A stage projector is employed in the entertainment industry to achieve spectacular effects by using light beams.

Generally, a lighting fixture comprises at least one movable element; a lighting unit for generating a light beam; and at least one rotary actuator for moving the at least one movable element. The movable element can be defined by a head of the lighting fixture that houses the lighting unit and which is moved by two rotary actuators, one for the pan movement and another for the tilt movement; or it can be defined by another element housed within the head and movable with respect to the head thanks to a rotary actuator, for example a zoom lens housed in the head of the lighting fixture and movable along a zoom axis with respect to the lighting unit under the action of the rotary actuator.

Moreover, the lighting fixture includes driving units of the rotary actuator and a control unit of the rotary actuator coupled to the driving units to control the movements of the rotary actuator and of the associated movable element. The lighting fixture further comprises a detector, configured to detect the position of the movable element and coupled to the control unit to control the movements of the movable element.

A lighting fixture of this type is shown in the document WO 2013/139338.

Unfortunately, the control of the lighting fixture shown in the aforesaid document is expensive and complex.

SUMMARY OF THE INVENTION

It is therefore an object of the present invention to provide a lighting fixture to achieve spectacular effects having less drawbacks than those of the prior art.

The present invention therefore provides a lighting fixture comprising:
- at least one movable element;
- at least one rotary actuator coupled to the movable element to move the movable element;
- a transmission assembly coupled to the rotary actuator and to the movable element to transfer the movement between the rotary actuator and the movable element;
- at least one position sensor coupled to a component selected in a group comprising the transmission assembly, the rotary actuator and the movable element; the position sensor being configured to detect the position of the component;
- a calculation unit coupled to the position sensor and configured to determine a displacement of the component based on the positions detected by the position sensor.

Thanks to the present invention, the lighting fixture can detect the position of the movable element in a simple and economic way.

According to a preferred embodiment of the present invention, the position sensor is angular and is configured to detect the angular position of the component; and the calculation unit is configured to determine the number of revolutions and the direction of the component according to the angular positions detected by the position sensor.

According to a preferred embodiment of the present invention, the transmission assembly is configured to convert the rotary movement of the rotary actuator in a linear movement and to move the movable element along an axis; the position sensor is linear and is configured to detect the linear position of the movable element along the axis; and the calculation unit is configured to determine the linear position of the movable element according to the positions detected by the position sensor.

According to a preferred embodiment of the present invention, the rotary actuator is an electric motor.

According to another preferred embodiment of the present invention, the calculation unit is configured to define the absolute position of the movable element based on the displacement of the component, preferably based on the detected number of revolutions and on the direction of the component.

According to another preferred embodiment of the present invention, the lighting fixture comprises a control unit coupled to the calculation unit and configured to receive the absolute position of the movable element from the calculation unit.

According to another preferred embodiment of the present invention, the lighting fixture comprises a passive movement detector of the electric motor configured to detect when the electric motor is not powered and rotates at a speed higher than a given speed threshold; the passive movement detector being configured to send a movement signal to the control unit. According to another preferred embodiment of the present invention, the lighting fixture includes an electrical energy accumulator and an electrical energy management unit coupled to the position sensor and to the calculation unit for powering the position sensor and the calculation unit through the accumulator when the lighting fixture is not powered by an external source of electrical energy; wherein the management unit is configured to power the calculation unit and the position sensor at a given time interval; preferably, the given time interval is calculated according to the detected speed.

In another preferred embodiment of the present invention, the actuator is an electrical machine with permanent magnets and the electrical energy management unit is configured to power the position sensor and the calculation unit with the electrical energy produced by the actuator according to the movement signal received from the passive movement detector.

Another preferred embodiment of the present invention comprises a trace coupled to the component and the sensor comprises a detection module and a calculation module; preferably the trace being defined by a shaped wheel or by a shaped linear element, and the component being the transmission assembly.

According to another preferred embodiment of the present invention, the detection module comprises detecting elements of inductive or capacitive or optical or magnetic type.

According to another preferred embodiment of the present invention, the trace includes teeth spaced from one another by a spacing; and the detecting elements are inductors; and the calculation module is configured to detect inductance values of the detecting elements and to define the position of the shaped wheel based on the detected values.

Another object of the present invention is to provide a control method of a lighting fixture to achieve spectacular effects, which reduces the drawbacks of the prior art.

According to one embodiment, it is provided a control method of a lighting fixture; the lighting fixture comprising: at least one movable element; at least one rotary actuator coupled to the movable element to move the movable element; a transmission assembly coupled to the actuator and to the movable element to transfer the movement between the rotary actuator and the movable element; the control method comprising the steps of detecting a position of a component selected in a group comprising the transmission assembly, the actuator and the movable element; determining a displacement of the component according to the detected positions.

According to a preferred embodiment of the present invention, the method comprises the steps of detecting the angular positions of the component; determining the number of revolutions and the direction of the component according to the detected angular positions. According to one embodiment of the present invention, the method comprises converting the rotary movement of the rotary actuator in a linear movement and moving the movable element along an axis; detecting the linear position of the movable element along an axis; and determining the linear position of the movable element according to the positions detected by the position sensor.

According to a preferred embodiment of the present invention, the control method comprises the step of defining the absolute position of the movable element according to the determined displacement.

According to a preferred embodiment of the present invention, the control method comprises the step of detecting passive movements of the rotary actuator exceeding a given speed threshold and using the rotary actuator as a generator of electrical energy when it rotates at a speed higher than the given speed threshold.

According to a preferred embodiment of the present invention, the control method comprises the step of using a trace associated with the rotating actuator and a detection module comprising inductors facing the trace, and of measuring the level of inductance of the inductors to define the position.

BRIEF DESCRIPTION OF THE DRAWINGS

Further characteristics and advantages of the present invention will become clear from the following description of non-limiting embodiments, with reference to the figures of the accompanying drawings, in which.

DETAILED DESCRIPTION OF THE INVENTION

Figure 1:
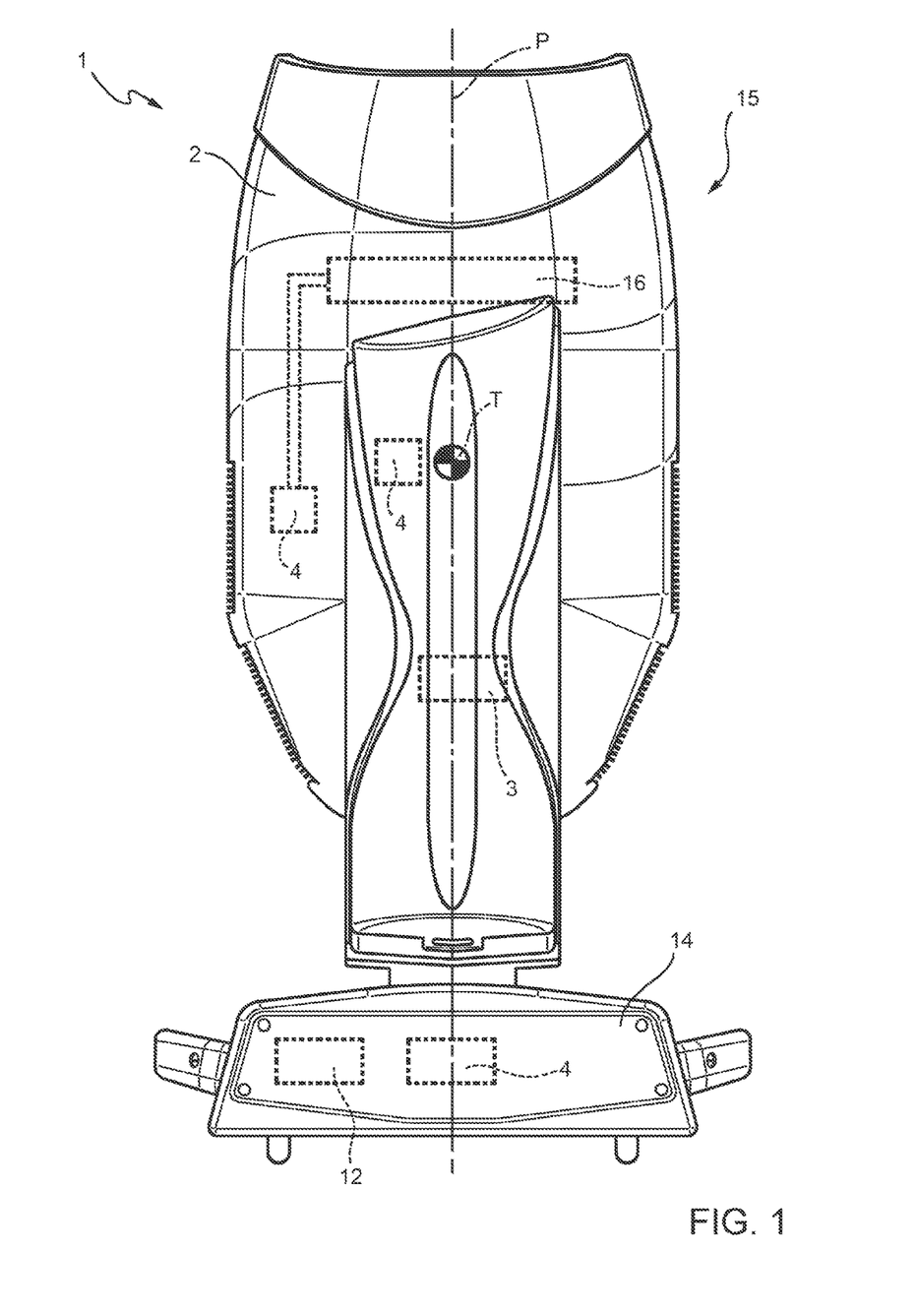
FIG. 1 is a side view, with parts removed for clarity's sake, of a lighting fixture to achieve spectacular effects according to the present invention.

FIG. 1 indicates with the reference number 1 a lighting fixture, in particular to achieve spectacular effects, comprising a base 14; a plurality of movable elements 15; a lighting unit 3 to generate a light beam along an optical axis; a plurality of rotary actuators 4 to move the movable elements 15; a transmission assembly 5 (FIG. 2), 105 (FIG. 4) for each actuator 4 coupled to the respective actuator 4 and the respective movable element 15 to transfer the movement between the respective actuator 4 and the respective movable element 15; a driving unit 6 for each rotary actuator 4 and connected to the respective rotary actuator 4; a position sensor 7, 107 (FIG. 2, FIG. 4) for each rotary actuator 4; a calculation unit 8 (FIG. 2) coupled to the position sensor 7, 107 and comprising a non-volatile memory 8a; and a control unit 12. Each movable element 15 is configured to move along an axis or to rotate about an axis between a first starting position and a first final position. The movable elements 15 are defined, for example, by a head 2, rotating relative to the base 14, or by a zoom lens 16 housed in the head 2 which moves with respect to the lighting unit 3.

With reference to FIG. 1, the head 2 is mechanically coupled to two of the rotary actuators 4 to rotate respectively around a pan axis P and a tilt axis T.

In the embodiment shown in the attached figures, the rotary actuators 4 are rotary electric motors 4.

Figure 2:
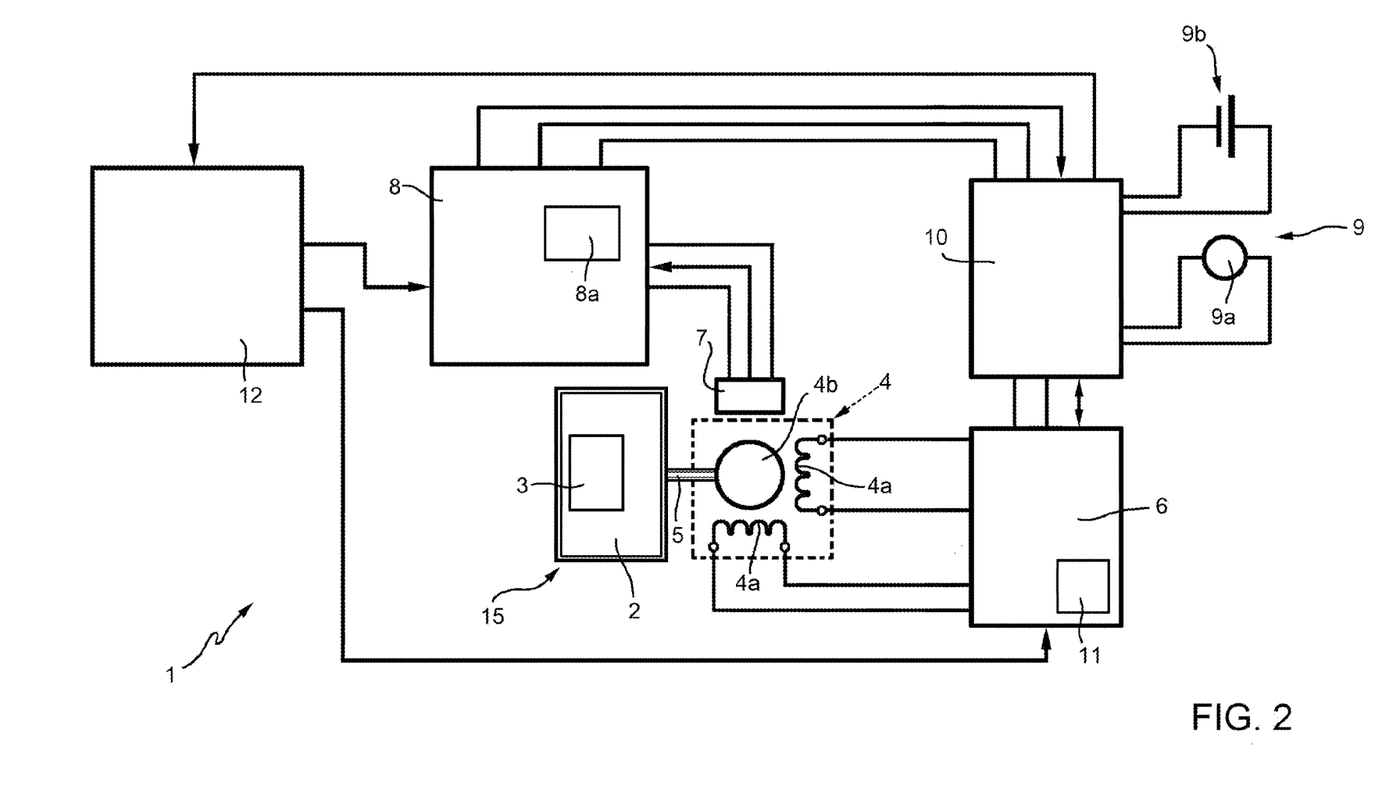
FIG. 2 is a schematic view, with parts removed for clarity's sake, of the lighting fixture of FIG. 1.

With reference to FIG. 2, it shows only one rotary actuator 4 coupled to the head 2 for simplicity's sake.

The lighting fixture 1 includes a power supply unit 9 having a power supply unit 9a and an accumulator 9b; and a management unit 10 of the power supply unit 9. In more detail, the power supply unit 9a is a D.C. power supply unit. In a non-limiting embodiment of the present invention, the power supply unit 9a also powers the lighting unit 3.

The power supply unit 9a is connected to the driving units 6 and powers each motor 4 through the respective driving unit 6.

Figure 3:
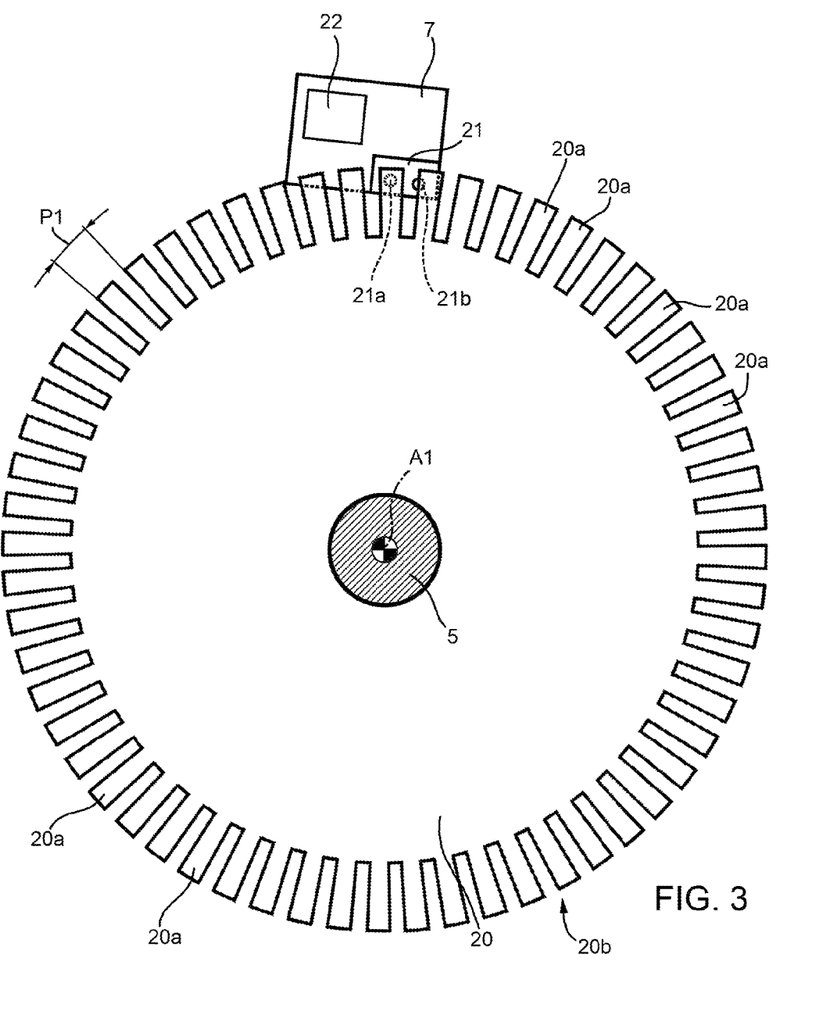
FIG. 3 is a schematic view, with parts removed for clarity's sake, of a detail of the lighting fixture of FIG. 1.

In more detail, each motor 4 is an electric stepper motor having two windings 4a and a rotor rotating about an axis A1 (FIG. 3). The driving unit 6 is connected to the windings 4a of the respective electric motor 4. The rotor 4b is coupled to the transmission assembly 5 to transfer the movement between the rotor 4b and the movable element 15, in particular the head 2.

In another embodiment, not shown in the attached figures, the motor 4 can be any type of motor with permanent magnets.

The position sensor 7 in FIG. 2 is coupled to the rotor 4b and is an angular position sensor 7 configured to detect the angular position of the rotor 4b. The position sensor 7 may be a Hall effect angular sensor or a magnetic resistive sensor or an encoder or another type of angular sensor.

The angular position sensor 7 is coupled to the calculation unit 8 and provides the detected data to the calculation unit 8, in other words the angular sensor 7 provides the calculation unit 8 with the absolute position of the rotor 4b. The calculation unit 8 obtains the number of revolutions and the direction of rotation of the rotor 4b based on the absolute positions of the rotor 4b detected by the position sensor 7. In more detail, the calculation unit 8 monitors the position detected by the position sensor 7 and its variations over time, to define and store the absolute angular position of the rotor 4b, the number of revolutions and the direction of rotation. Finally, the calculation unit 8 defines the position about the respective axis 15 of the movable element to which it is associated according to the total number of revolutions, the direction, the absolute position and the gear ratio between the rotor 4b and the movable element 15. The calculation unit 8 sends the position of the movable element 15 about the respective axis to the control unit 12.

In a preferred embodiment of the present invention, the calculation unit 8 calculates a speed of the rotor 4b from the data received from the position sensor 7.

In a preferred embodiment of the present invention, the calculation unit 8 calculates a speed of the movable element 15 from the data received from the position sensor 7.

In another embodiment, the position sensor 7 is coupled to the transmission assembly 5 and detects the angular position of the transmission assembly 5.

When the lighting fixture 1 is turned on and connected to an external power source, the management unit 10 connects the power supply unit 9a to the calculation unit 12, to the position sensor 7, to the driving unit 6 and to the electric motor 4 to supply energy.

When the lighting fixture 1 is turned off and not connected to an external power source, the management unit 10 powers the calculation unit 12 and the position sensor 7 through the accumulator 9b when it detects that the power supply unit 9a does not supply electrical energy.

In a preferred but non-limiting embodiment of the present invention, the driving unit 6 comprises a passive movement detector 11 that communicates with the management unit 10 and is configured to detect a movement of the rotor 4b at speeds exceeding a first speed threshold when the electrical machine 4 is not powered, and to send a movement signal to the management unit 10. In this embodiment, the management unit 10 powers the calculating unit 12 and the position sensor 7 through the accumulator 9b or with the energy produced by the electric motor 4. In more detail, when the management unit 10 detects that the power supply unit 9a does not supply any electric energy, it uses the energy of the accumulator 9b or the energy produced by the electric motor 4 working as a generator, and provides the calculation unit 8 and the position sensor 7 with it. In more detail, the passive movement detector 11 detects whether the electrical machine 4 supplies a voltage higher than a certain threshold voltage to the terminals of the windings 4a.

The management unit 10 is configured to operate the lighting fixture 1 in a plurality of operating modes when the lighting fixture 1 is turned off and is not powered by an external source, namely when the power supply unit 9a does not supply electrical energy. The plurality of operating modes are designed to reduce the consumption of electrical energy of the accumulator 9b.

In a first operating mode, the management unit 10 is configured to power the calculation unit 8 and the position sensor 7 by using the energy of the accumulator 9b. The management unit 10 is configured to activate the first operating mode when the management unit 10 does not receive a signal from the passive movement detector 11 of the electric motor 4 or when the driving unit 6 does not include a passive movement detector 11.

In this case, in the first operating configuration, the management unit 10 is configured to power the calculation unit 8 and the position sensor 7 at given time intervals through the accumulator 9b. The time intervals are calculated based on the detected instantaneous speed and on the length of the circumference on which the angular position is measured. In more detail, if the detected instantaneous speed is lower than a second speed threshold, the time interval is fixed and must be shorter than the time it takes to make a half turn at the second speed threshold. If, on the other hand, the instantaneous speed is higher than the second speed threshold, the time interval is variable and varies according to the detected instantaneous speed. In particular, the time interval must be shorter than the time it takes to make a half turn at the detected instantaneous speed. In this way, the position sensor 7 calculates the position of the rotor 4b in each time interval and sends it to the calculation unit 8, which stores the angular position and the number of revolutions in each time interval in the memory 8a.

The management unit 10 is configured to operate in a second operating mode when the driving unit 6 comprises the passive movement detector 11, the lighting fixture 1 is turned off, the rotor 4b is rotating due to external forces and the rotation speed is higher than the first speed threshold. In more detail, the management unit 10 is configured to activate the second operating mode when the passive movement detector 11 detects a speed of the rotor 4b higher than the first speed threshold and sends the movement signal to the management unit 10. In the second operating mode, the electric motor 4 works as an electric generator and the driving unit 6 is configured to provide energy to the management unit 10, which in turn uses it to charge the accumulator 9b and/or to power directly the position sensor 7 and the control unit 8. In this case, the management unit 10 is configured to power the calculation unit 8 and the position sensor 7 at given time intervals. The time intervals are calculated based on the instantaneous speed of the rotor 4b. In more detail, the time interval must be shorter than the time it takes to make a half turn at the detected instantaneous speed. In this way, the position sensor 7 calculates the position of the rotor 4b in each time interval and sends it to the calculation unit 8, which stores the angular position and the number of revolutions in each time interval in the memory 8a.

Moreover, the management circuit 10 is connected to the control unit 12 and is configured to send an exhaustion signal to the control unit 12 when the accumulator 9b is running low on stored energy. In this case, in fact, the lighting fixture 1 can no longer record the position of the movable elements 15 and, at the next switching on, the management unit 10 will start a position reset procedure to realign the measured position values.

With reference to FIG. 3, in a preferred non-limiting embodiment of the present invention, the position sensor 7 comprises a trace, in particular the trace is defined by a circular detection surface 20b of a shaped wheel 20 having a shaping spacing P1 and being fixed to the transmission assembly 5. In particular, the shaped wheel 20 has a variable radial profile. In other words, the shaped wheel 20 is a wheel having teeth 20a spaced from one another by the spacing P1.

In another embodiment not shown in the attached figures, the shaped wheel has not a variable radial profile and, at the circular detection surface, has a variable profile perpendicularly to the lying plane of the wheel.

In another embodiment, the shaped wheel has variable magnetic characteristics along the circular detection surface.

In another embodiment, the shaped wheel has variable electrical characteristics along the circular detection surface.

Furthermore, the position sensor 7 comprises a detection module 21 and a calculation unit, in particular a microprocessor 22.

The detection module 21 comprises two detecting elements 21a and 21b, which, in the embodiment shown in FIG. 3, are two inductors facing the shaped wheel 20.

Furthermore, in the preferred non-limiting embodiment of the present invention, the two inductors 21a and 21b are spaced by a distance equal to $nP1 \pm P1/4$, where n is any positive integer and P1 is the spacing P1.

In another embodiment of the present invention, the two inductors 21a and 21b are spaced by any distance excluding the distance equal to the spacing P1 or its multiples or a distance equal to half the spacing P1/2 and its multiples.

Moreover, the diameter of the inductor 21a, 21b is preferably but not limitedly chosen to be less than ⅓ of the given spacing P1.

According to another embodiment not shown in the attached figures, the two detecting elements 21a and 21b are of the capacitive or magnetic type.

In another embodiment, the two detecting elements are of the optical type and the shaped wheel has variable optical characteristics along the detection surface.

The detection module 21 detects the movement of the shaped wheel 20 through the two detecting elements 21a and 21b.

In more detail, the inductance of the two inductors 21a and 21b changes depending on the relative position between the teeth 20a and the inductors 21a and 21b. The microprocessor 22 detects the change of the inductance of the inductors 21a and 21b, in particular by injecting a current and measuring the decay time. The microprocessor 22 detects the movement and the direction of movement according to the detected change of inductance. In more detail, the induction value of each inductor may take three values: high, medium and low depending on the relative position between the detecting element 21a, 21b and the tooth 20a. Accordingly, by combining the levels detected by the detecting elements 21a, 21b, the microprocessor 22 detects up to eight different positions within the determined spacing P1. In particular, the eight positions are defined by the following pair of detectable levels: H, H; H, M; H, L; M, L; L, L; L, M; L, H; M, H.

In an alternative embodiment of the present invention, the induction value of each inductor can take any number of values depending on the relative position between the detecting element 21a, 21b and the tooth 20a and depending on the desired resolution. Accordingly, by combining the levels detected by the detecting elements 21a, 21b, the microprocessor 22 detects up to a plurality of different positions within the determined spacing P1.

The detection module 21 and the microprocessor 22 are independently powered by the management unit 10. Moreover, the detection module 21 is connected to microprocessor 22 and to the control unit 10 to send a wake up signal.

In more detail, when the management unit 10 is not powered by the power supply unit 9a, it enters a power saving operating mode. In the power saving operating mode, the management unit 10 powers the detection module 21 and the microprocessor 22 continuously or at time intervals, as previously seen. In more detail, the microprocessor 22 receives a power saving signal from the management unit 10 and enters a standby mode during which it does not draw any energy. When it detects a movement of the shaped wheel 20, the detection module 21 sends the wake up signal to the microprocessor 22 and to the control unit 10. When it receives the wake up signal, the microprocessor 22 leaves the standby mode and enters the ordinary operating mode. When it receives the wake up signal from the detection module 21, the management unit 10 powers the calculation unit 8.

In the various operating modes, with the exception of the standby mode, for each measurement and according to the detected pair of levels, the microprocessor 22 defines the absolute position of the shaped wheel 20 and sends it to the calculation unit 8. In an alternative embodiment of the present invention, the calculation unit 8 is implemented in the microprocessor 22, which, based on the absolute position detected in each measurement, defines a movement and a direction of the wheel 20. Finally, the microprocessor 22 algebraically adds the detected movement to the preceding ones and defines the absolute position, the number of revolutions and the direction.

When the lighting fixture 1 is not powered by an external source and consequently by the power supply unit 9a, the microprocessor 22 detects the extent of the inductance of the inductors 21a and 21b at each determined time interval. The time interval is calculated according to the spacing P1 of the teeth 20a, to the number of detectable positions within the spacing 20a of the tooth (in this case eight), to the detected speed or to the second speed threshold of the wheel 20a when it is not powered. In other words, the time interval is shorter than the time it takes to the shaped wheel 20 to move over two adjacent detectable positions.

Figure 4:
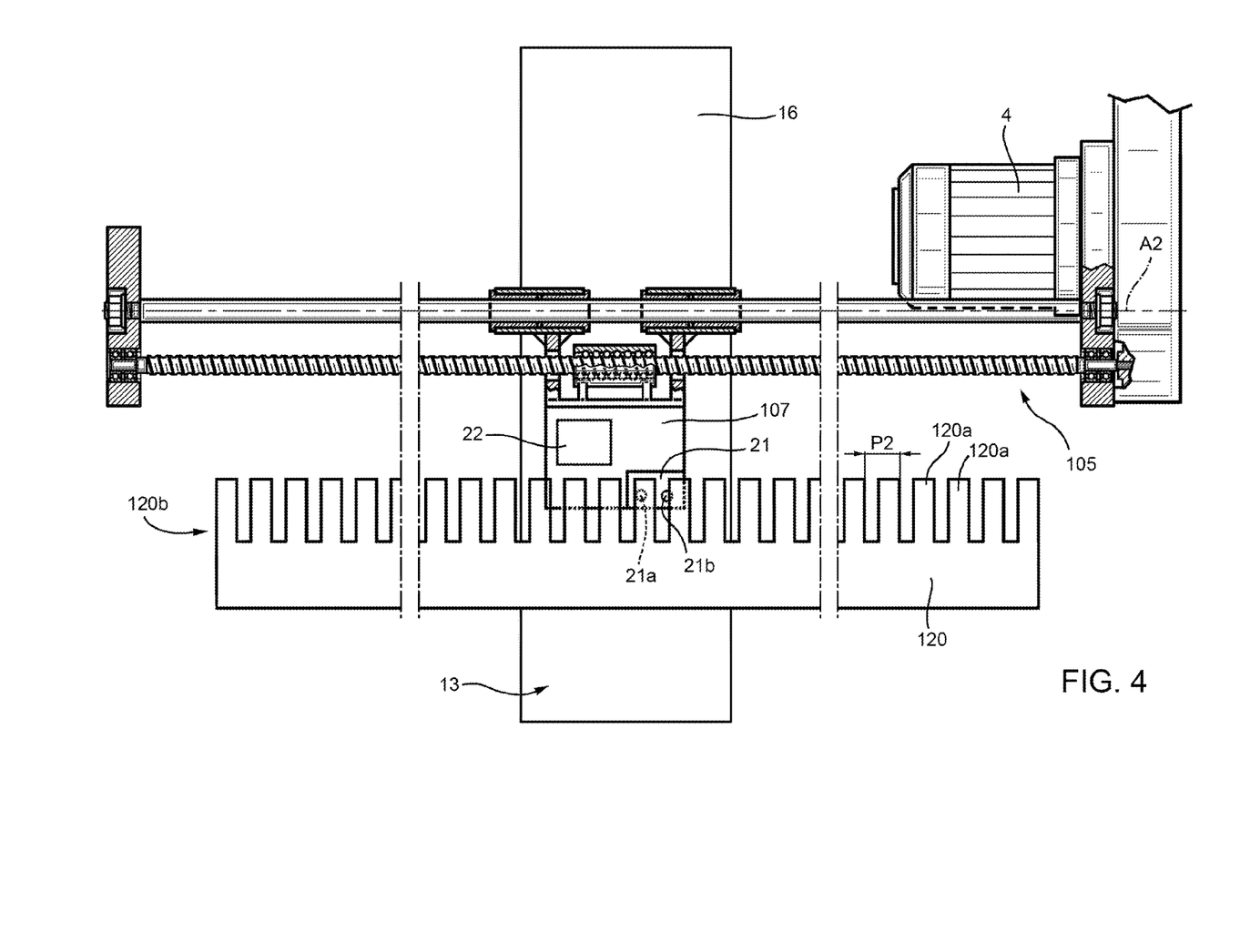
FIG. 4 is a schematic view, with parts removed for clarity's sake, of an alternative embodiment of the embodiment of FIG. 3.

According to an alternative embodiment of the present invention shown in FIG. 4, the sensor 7 is replaced by the sensor 107, which is a linear sensor and includes a trace, which is defined by a linear detection surface 120b of a linear shaped element 120 which replaces the shaped wheel 20. Furthermore, the zoom lens 16 is coupled to the rotary motor 4 through the transmission assembly 105 that is configured to convert the rotary movement of the rotary actuator 4 in a linear movement. By way of example, the transmission assembly 105 comprises a worm screw. Moreover, the sensor 107 includes a detection module 21 and a microprocessor 22 like the sensor 7. In more detail, the sensor 107 is coupled to the zoom lens 16 which moves along the zoom axis A2 and is configured to detect the linear position of the movable element 15, in particular of the zoom lens 16, parallel to the axis A2. The shaped linear element 120 extends along an axis parallel to the axis A2 and comprises a plurality of teeth P2 spaced from one another by a spacing P2 and defining the linear detection surface 120b. In use, thanks to the detection module 21 and to the microprocessor 22, the position sensor 107, analogously to the position sensor 7, detects the position of the movable element 15, in particular of the zoom lens 16, parallel to the axis A2. In more detail, the detection module 21 detects the displacement of the movable element 15 parallel to the axis A2 by measuring the inductances of the inductors 21a and 21b facing the teeth 120a. The operating modes of the sensor 107 are similar to the operating modes of the sensor 7.

Finally, it is evident that the lighting fixture here described can be subject to modifications and variations without departing from the scope of the appended claims.

The invention claimed is:

1. A lighting fixture comprising:
   at least one movable element (15);
   at least one rotary actuator (4) coupled to the movable element to move the movable element (15);
   a transmission assembly (5; 105) coupled to the rotary actuator (4) and to the movable element (15) to transfer the movement between the rotary actuator (4) and the movable element (15);
   at least one position sensor (7; 107) coupled to a component selected in a group comprising the transmission assembly (5; 105), the rotary actuator (4) and the movable element (15); the position sensor (7; 107) being configured to detect the position of the component;
   a calculation unit (8) coupled to the position sensor (7; 107) and configured to determine a displacement of the component based on the positions detected by the position sensor (7; 107);
   the position sensor (7) being angular and being configured to detect the angular position of the component; the calculation unit (8) being configured to determine the number of revolutions and the direction of the component based on the angular positions detected by the position sensor (7).

2. A lighting fixture according to claim 1, wherein the transmission assembly (105) is configured to convert the rotary movement of the rotary actuator (4) in a linear movement and to move the movable element (15) along an axis (A2); the position sensor (107) being linear and being configured to detect the linear position of the movable element (15) along the axis (A2); and wherein the calculation unit (8) is configured to determine the linear position of the movable element (15) based on the positions detected by the position sensor (107).

3. A lighting fixture according to claim 1, wherein the rotary actuator (4) is an electric motor.

4. A lighting fixture according to claim 1, the calculation unit (8) being configured to determine the absolute position of the movable element (15) based on the displacement of the component.

5. A lighting fixture according to claim 4, comprising a control unit (12) coupled to the calculation unit (8) and configured to receive the absolute position of the movable element (15) from the calculation unit (8).

6. A lighting fixture according to claim 3, comprising a passive movement detector (11) of the electric motor (4) configured to detect when the electric motor (4) is not powered, and rotating at a speed higher than a given speed threshold; the passive movement detector (11) being configured to send a movement signal to the control unit (8).

7. A lighting fixture according to claim 6, comprising an electrical energy accumulator (9b) and a management unit (11) of the electrical energy coupled to the position sensor (7; 107) and to the calculation unit (8) to power the position sensor (7; 107) and the calculation unit (8) through the accumulator (9b) when the lighting fixture (1) is not powered by an external electrical energy source; wherein the control unit (10) is configured to power the calculation unit (10) and the position sensor (7; 107) at a given time interval; the given time interval being preferably calculated according to the detected speed.

8. A lighting fixture according to claim 1, wherein the rotary actuator (4) is an electrical machine with permanent magnets; and wherein the power control unit (10) is configured to power the position sensor (7; 107) and the calculation unit (8) with the electrical energy produced by the actuator (4) based on the movement signal received by the passive movement detector (11).

9. A lighting fixture according to claim 1, comprising a trace (20b; 120b) coupled to the transmission assembly (5; 105) and wherein the position sensor (7; 107) comprises a detection module (21) and a calculation module (22); preferably the trace (20b; 120b) being defined by a shaped wheel (20) or by a shaped linear element (120), and the component being the transmission assembly (5; 105).

10. A lighting fixture according to claim 9, wherein the detection module (21) comprises detecting elements of inductive, capacitive, optical or magnetic type.

11. A lighting fixture according to claim 9, wherein the trace (20b; 120b) comprises teeth (20a; 120a) spaced from one another by a spacing (P1; P2); and the detecting elements (21a, 21b) are inductors; wherein the calculation module (22) is configured to detect inductance values of the detecting elements (21a, 21b) and to define the position based on the detected values.

12. A control method for a lighting fixture; the lighting fixture comprising: at least one movable element (15); at least one rotary actuator (4) coupled to the movable element (15) to move the movable element (15); a transmission assembly (5; 105) coupled to the actuator (4) and to the movable element (15) to transfer the movement between the actuator (4) and the movable element (15); the control method comprising the steps of detecting a position of a component selected in a group comprising the transmission assembly (5; 105), the actuator (4) and the movable element (15); and of determining a displacement of the component based on the detected positions; comprising detecting passive movements (11) of the rotary actuator (4) exceeding a given speed threshold and using the rotary actuator (4) as an electrical energy generator when it rotates at a speed higher than the given speed threshold.

13. A control method according to claim 12, comprising detecting the angular positions of the component and determining the number of revolutions and the direction of the component based on the detected angular positions.

14. A control method according to claim 12, comprising transforming the rotary movement of the rotary actuator (4) in a linear movement and moving the movable element (15) along an axis (A2); detecting the linear position of the component along the axis (A2); and determining the linear position of the movable element (15) based on the detected positions.

15. A control method according to claim 12, comprising defining the absolute position of the movable element (15) based on the determined displacement.

16. A control method according to claim 12, comprising using a trace (20b; 120b) associated with the rotary actuator (4) and a detection module (21) comprising inductors (21a; 21b) facing the trace (20b; 120b) and measuring the level of inductance of the inductors (21a; 21b) to define the position.

17. A lighting fixture comprising: at least one movable element (15); at least one rotary actuator (4) coupled to the movable element to move the movable element (15); a transmission assembly (5; 105) coupled to the rotary actuator (4) and to the movable element (15) to transfer the movement between the rotary actuator (4) and the movable element (15); at least one position sensor (7; 107) coupled to a component selected in a group comprising the transmission assembly (5; 105), the rotary actuator (4) and the movable element (15); the position sensor (7; 107) being configured to detect the position of the component; a calculation unit (8) coupled to the position sensor (7; 107) and configured to determine a displacement of the component based on the positions detected by the position sensor (7; 107); a trace (20b; 120b) coupled to the transmission assembly (5; 105) and wherein the position sensor (7; 107) comprises a detection module (21) and a calculation module (22); preferably the trace (20b; 120b) being defined by a shaped wheel (20) or by a shaped linear element (120), and the component being the transmission assembly (5; 105).

18. A lighting fixture according to claim 17, wherein the detection module (21) comprises detecting elements of inductive, capacitive, optical or magnetic type.

19. A lighting fixture according to claim 17, wherein the trace (20b; 120b) comprises teeth (20a; 120a) spaced from one another by a spacing (P1; P2); and the detecting elements (21a, 21b) are inductors; wherein the calculation module (22) is configured to detect inductance values of the detecting elements (21a, 21b) and to define the position based on the detected values.

20. A lighting fixture according to claim 17, wherein the rotary actuator (4) is an electric motor; and comprising a passive movement detector (11) of the electric motor (4) configured to detect when the electric motor (4) is not powered, and rotating at a speed higher than a given speed threshold; the passive movement detector (11) being configured to send a movement signal to the control unit (8).

\* \* \* \* \*